United States Patent [19]

Goldman et al.

[11] Patent Number: 4,804,012
[45] Date of Patent: Feb. 14, 1989

[54] AQUARIUM AIR VALVE SYSTEM AND HANGER UNIT

[75] Inventors: Jerome Goldman, New York; Marvin Goldman, Great Neck; Gerald Phillips, Glen Cove; Terry Goldman, New York, all of N.Y.

[73] Assignee: Penn Plax Plastics, Inc., Garden City, N.Y.

[21] Appl. No.: 62,973

[22] Filed: Jun. 17, 1987

[51] Int. Cl.$^4$ ............................................. F16L 3/00
[52] U.S. Cl. ................................... 137/343; 137/883; 119/5
[58] Field of Search ................... 137/883, 343; 119/5

[56] References Cited

U.S. PATENT DOCUMENTS

| | | | |
|---|---|---|---|
| 2,776,642 | 1/1957 | Sepersky | 119/5 |
| 3,092,141 | 6/1963 | Stark | 137/883 |
| 3,154,102 | 10/1964 | Harris | 137/883 |
| 4,301,767 | 11/1981 | Willinger et al. | 119/5 |

FOREIGN PATENT DOCUMENTS 2754110  6/1979  Fed. Rep. of Germany .......... 119/5

OTHER PUBLICATIONS

Cappet Corporation Catalog, "Aquarium Accessories", (C2-000), 06/1959.

Primary Examiner—A. Michael Chambers
Attorney, Agent, or Firm—R. Scott Goldman

[57] ABSTRACT

The present invention is a an aquarium air valve system and hanger unit for control of air entering an aquarium. The valve system has one or more valves thereon and is provided with a means for controlling the air flow from each valve. The valve system is mounted to the outer surface of the top wall of a hanger unit. The top wall is of adjustable size in order to allow secure fit over a variety of types of aquarium top frames. A valve system cover may also be provided in order to protect the valve system from accumulating metallics and debris.

18 Claims, 2 Drawing Sheets

AQUARIUM AIR VALVE SYSTEM AND HANGER UNIT

BACKGROUND OF THE INVENTION

The present invention relates generally to an aquarium air valve system and hanger unit for use in providing forced air into an aquarium from an aquarium air pump. More particularly this invention relates to an aquarium air valve system and hanger unit which may be hung over the top edge of an aquarium wall and which may receive air from an aquarium air pump by way of a passage formed by air line tubing, entering at an entry orifice of the valve system, and which may be connected to aquarium accessaries or ornamental items by way of air line tubing communicating with one or more exit orifices from the valve system.

The present invention finds use in providing forced air, from an aquarium air pump, into the water of an aquarium used to house fish. It is suited for general use in providing air for powering a variety of aquarium accessaries and ornamental items by the home aquarium hobbyist, by the researcher in a laboratory setting, by the pet shop operator, or in similar circumstances.

Providing a source of forced air is an essential component in order to maintain fish in an aquarium setting. Forced air, usually provided by an aquarium air pump, is used to provide air bubbles in the aquarium water. The bubbles power aquarium accessaries such as corner filters, under gravel filters, cleaning units, air stones, and the like. Further, air bubbles are used to power movable aquarium ornaments, and for other ornamental purposes both in conjunction with ornamental items, and through a variety of air stones and bubbling devices. Additionally, the forced air bubbles provide essential aeration of the aquarium water. This is necessary in order to provide a suitable habitat for the aquarium fish. In order to assure proper functioning of the air operated accessaries and ornaments it is essential to precisely control the amount of air which is provided to each aquarium item.

Conventionally, air line tubing of about ¼ inch in diameter is used as the air passageway in aquarium settings. The air line tubing is connected to an outlet orifice of an aquarium air pump. Generally, rather than entering the aquarium directly, the air line tubing passageway is connected to a valve system which divides and controls the air flow. The valve system generally has a valve system body in the form of a hollow square or cylindrical tube. The entry orifice is usually in the form of a hollow projection which is of an outer size allowing for secure fit into the air line tubing. The hollow projecting portion extends from an end wall of the valve system body. The valve system is often provided with more than one exit orifice from the body of the valve system to which individual segments of air line tubing are attached. The exit orifices are generally in the form of hollow projections from the side wall of the valve system body. The individual segments of tubing may be connected to individual aquarium accessaries and ornamental items.

The forced air stream entering the valve system through the entry orifices may be divided between a number of exit orifices so that it exits through each of the exit orifices at proportionally reduced pressure. Further, the valve system is usually provided with a means to control the relative amount of air entering the aquarium through each of the exit orifices so that the air pressure of each outgoing air stream may be precisely controlled, or turned off entirely in order to power the aquarium items.

The means to divide, control and direct the relative amount of air exiting through each of the exit orifices is conventionally in the form of individually controllable valves at each exit orifice of the valve system. The valve control may be hand operated by a knob or a lever bar extending from the hollow projection of the exit orifice or valve body. The knob or lever bar is conventionally attached to a projecting segment which projects into the hollow of the hollow projection or the hollow of the valve body. The projecting segment is formed so that it may block off all or a portion of the hollow of the hollow projection of the exit orifice, based upon the position of the knob or lever bar. The relative amount of blockage of the hollow passageways allows for adjustment and control of the amount of air which can exit through the exit orifice.

The valve systems employed in aquarium aeration uses are customarily mounted on a hanger to form an aquarium air valve system and hanger unit. The hanger conventionally has a U shaped top segment which, when inverted, can hang over the top of an aquarium wall. Conventionally, the U shaped top segment is rigidly formed and the size of the inner portion of the U is prepared in a preset size. The hanger unit ordinarily has an elongated back wall, about two to three inches in length which forms one leg of the U shaped top segment. This positioned outside of the aquarium when in use. A short front lip which contacts the inner side of the aquarium wall when in use forms the other leg of the U shaped top segment. A top wall forms the connecting leg of the U.

The valve system is customarily removably attached to the bottom of the elongated back wall of the hanger in a manner so that the hollow projections of the exit orifices are pointed up, toward the U shaped top segment. This facilitates running air line tubing from the hollow projections of the valve system, up to the top of the aquarium wall, over the top, and then down into the aquarium, paralleling the elongated back wall, top wall, and front lip of the U shaped top segment. Often, the U shaped top segment is provided with grooves, or channels in order to direct and maintain the air line tubing in proper position in order to enter the aquarium from the hollow projection of the valve system exit orifice.

Based upon the above noted arrangement of the exit orifice hollow projections, and the hanger unit, the valve knob or lever bar extend from the valve body in a direction away from the aquarium. Further since the valve system is mounted at the bottom of the elongated back wall of the hanger the valve controls are positioned about two to three inches below the top of the aquarium.

The above described conventional valve system and hanger arrangement presents a variety of problems when used in an aquarium setting. As indicated above, in order to assure proper functioning of aquarium accessaries and ornamental items it is critical to precisely control the amount of air exiting each of the exit orifices of the valve system body. It is often necessary to fine tune the air pressure adjustments in order to maintain suitable functioning. Such adjustments are often difficult with conventional aquarium air valve systems and hanger units. This is because air valve and hanger units are customarily hung over the back wall of the aquarium and it is difficult to reach back behind the aquarium to get to the valve controls which are positioned well below the top of the aquarium wall. Also, since the valve controls are out of sight, it is difficult to determine the air flow setting of the control. This problem is compounded when the aquarium is placed next to a wall or other solid structure, or inside a cabinet or case, providing little room to maneuver the valve controls.

Additionally, aquariums generally have top frames covering over the top of the aquarium walls. These frames vary in size (thickness) depending upon the size of the aquarium and manufacturer. Since the U shaped top segment of the hanger is conventionally in rigid form the length of the top wall cannot be adjusted to properly and securely fit over the top frame of different types of aquarium. This problem is often compounded when the aquarium air valve system and hanger unit is placed upon a tank having a three dimensional decorative background attached to the back wall of the aquarium. Further, since the aquarium air valve system and hanger unit are positioned at the top of an aquarium containing bubbling water mineral deposits and debris often accumulate at the top of the unit creating an undesirable appearance and adverse operation of the valve controls.

The present invention was developed in order to overcome the above noted drawbacks which have long been known to plague the conventional aquarium air valve and hanger units. The present invention provides easy manipulation of the valve controls, and allows the user to see the control setting. It therefore eliminates fumbling and guessing behind the aquarium to adjust hard to reach valve controls. Further, the present invention allows for proper fit of the hanger unit over the top of the aquarium wall, and provides protection against, and ease of cleaning of built up mineral and debris deposits on the aquarium air valve system and hanger unit.

SUMMARY OF THE PRESENT INVENTION

It is an object of the present invention to provide an aquarium air valve system and hanger unit which allows for ease of control over the amount of air entering the aquarium through one or more exit orifices, regardless of the placement of the aquarium tank.

It is a further object of the present invention to provide an aquarium air valve system and hanger unit which provides visibility of the valve controls at the top of the aquarium.

It is another object of the present invention to provide an aquarium air valve system and hanger unit which may be adjusted to securely fit over a variety of aquarium top frames, even when a three dimensional aquarium background is in place on the back wall of the aquarium.

It is still a further object of the present invention to provide an aquarium air valve system and hanger unit which allows for protection from, and ease of cleaning of, mineral deposits and debris which will inevitably accumulate on objects place at the top of an aquarium wall.

The present invention is an aquarium air valve system and hanger unit which is used to regulate the flow of air from an aquarium air pump into an aquarium. The invention functions to divide a single air stream from the aquarium air pump into one or more individual air streams in order to power one or more aquarium accessaries or ornamental items. Further, the present aquarium air valve system and hanger unit provides for the control of the amount of air which enters the aquarium with each individual air stream.

The present invention has, as the main component thereof, a conventional valve system well known in the art. The valve system is generally made entirely of non-corrosive brass. The brass may also be coated with a chrome outer covering. It is also possible to form the valve system from other noncorrosive materials such as plastic and other noncorrosive metals.

The valve system has a valve body in the form of a hollow pipe segment, generally with a rounded or square outer configuration. At one end of the valve body is an entry orifice which provides the passageway for forced air from an aquarium air pump to enter the inner hollow of the valve body. Generally, the entry orifice is in the form of a hollow projection attached to the end of the valve body in an air tight manner. This hollow projection is usually in a truncated cone shape configuration tapering away from the valve body. The taper is formed so that it varies in outside diameter from a size which is smaller than the inside diameter of the customary air line tubing, at the tip, to a size that is larger than the inside diameter of the customary air line tubing at the base point near the attachment to the end of the valve body. This allows for ease of the attachment of air line tubing from the aquarium air pump. Often ridges are placed on the outer surface of the hollow projection, which contacts the aquarium air line tubing, and a larger diameter lip is formed at the tip end. This allows for secure attachment of the air line tubing to the entry orifice hollow projection.

The end of the valve body opposite the entry orifice must be closed off so that the air cannot escape therethrough. This assures that the air forced into the hollow of the valve body exits through the exit orifices discussed below. Often a hollow projection similar, or identical to that forming the entry orifice is formed at the opposite end of the valve body. The inner wall of this hollow projection is then threaded so that a stopper screw, usually having a rubber type washer thereon, may be securely screwed into the hollow of the projection in order to block the flow of air out of the valve body through the hollow opposite the entry orifice.

The stopper screw may function as an additional air flow control mechanism for the valve system, working as a bleeder valve. The stopper screw, when screwed in completely, fully blocks the flow of air out of the hollow projection. However, in the event that it is necessary to reduce the flow of air overall through the exit orifices of the valve system, the stopper screw may be screwed in more loosely in order to allow excess air to flow out through space between the screw threads and inner wall of the hollow projection. This will reduce the amount of air available to exit through the exit orifices of the valve system.

As noted, the valve system is provided with one, and generally more than one exit orifice along the length of the valve body. These orifices provide the exit point for the air streams which are directed into the aquarium. It is conventional in aquarium systems to connect aquarium accessaries and ornamental items to the valve system with vinyl or plastic hollow air line tubing of about one eighth to three eighths inch inner diameter. This is the same air line tubing which is conventionally used in order to connect the entry orifice of the valve body to the aquarium air pump. Therefore, the exit orifices are generally formed from hollow projections similar or identical to the hollow projections described above as forming the entry orifice. This allows for secure and air tight attachment of the air line tubing to the exit orifice.

Each exit orifice is provided with a valve and valve control in order to adjust the flow of air through the individual exit orifices. The valve control is conventionally in the form of a knob or lever bar which is attached to a rotatably projecting segment. The projecting segment projects into the hollow of the valve body, or the hollow of the hollow projection of the exit orifice. The projecting segment is formed in such a manner so that it may completely close off the exit orifice, or leave the orifice completely open. Also, partial blockage of the orifice hollow may be accomplished in order to reduce or increase the air flow through the exit orifice. The projecting segment is attached to the control knob or lever bar so that the rotation of the control knob or lever bar causes rotation of the projecting segment to open or close the exit orifice. The use of a lever bar is preferable since this allows for visual assessment of the relative opened or closed state of the valve.

The valve system is securely, or removably attached to a hanger and which can fit over the top of a wall of the aquarium. Generally the attachment is removable. The hanger has a substantially U shaped top segment which, when inverted, fits over the top frame of the aquarium with the side walls pointing down, and the inner surface of the base of the U, the top wall, contacting the top of the aquarium side wall. In the present invention, contrary to the conventional practice in the art, the valve system is mounted on the top of the of the hanger, on the outer surface wall of the base of the U. The valve system may be attached in a number of manners, such as adhesives, and slidable or snap in connections. It is preferable to mount the valve systems by forming a channel which can securely hold the body of the valve system. The channel may be formed from upwardly projecting walls from the outer surface of the top wall of the hanger unit. The upwardly projecting walls can also be formed into one or more channels at right angles to the valve body channel, into which the individual valves, or hollow projections may fit. The hanger unit may be made of any suitable material which is not corrosive, such as a variety of metals, or wood. However, it is preferable if the hanger is formed of a plastic material.

As noted above, in the present invention, the valve system is mounted on the outer surface of the top wall, or base portion of the U shaped top segment of the hanger. Because of this the valve system, and valve controls remain on the top of the aquarium when the hanger is in place. This inventive aspect of the present invention facilitates the control of the air flow through the valves when the hanger is placed on the aquarium. In conventional practice the valve system is mounted at the bottom of the back wall of the hanger, wherein the valve controls are below the top of the aquarium wall. This makes it hard to reach the controls and almost impossible to see them in general use. The present invention allows ready access to the valve controls since they are on the outer surface of the top of the hanger, and at the top of the aquarium wall, rather than hanging well below the top of the aquarium wall at the bottom of the hanger. Further, this arrangement of the valve system on the hanger allows for visual observation of the setting of the valve control.

The present invention also provides for adjustment of the length of the top wall of the hanger (the base of the U). This allows for changing the size of the top wall of the hanger unit, so that the hanger size may be adjusted in order to securely fit over a variety of sized of aquarium top wall frames. This also provides for secure fit when a three dimensional aquarium background is on the aquarium. The size range for the adjustment of the length of the upper wall should be about one half inch, to about three inches.

It is preferable if the adjustment in the length of the top wall is accomplished by slidably mounting an extendible front portion of the top wall into a sleeve formed on a back section of the top wall. The front extendible portion of the top wall has at the front thereof, the front lip of the hanger projecting in a downward manner from the front end of the extendible portion of the upper wall. The back portion of the upper wall of the hanger has, projecting from the back thereof in a downward direction, the elongated back wall of the hanger. The front lip of the hanger is preferably a short downward projection which forms a lip over the inner side of the top of the aquarium wall. The back wall of the hanger is preferably longer than the front wall to allow for secure attachment of the hanger to the aquarium.

It is preferable to provide a means to firmly maintain the length of the upper wall of the hanger once it is adjusted. This may be accomplished in number of manners such as clips and stay pins. The inventors have found that one suitable means to firmly maintain the length of the top wall is to provide narrow channels on the inner surface of the extendible portion of the top wall. These channels serve as stops. A slightly flexible wall portion may then project from the inner side of the upper portion of the back wall, in the direction of the front lip portion. This slightly flexible wall portion is provided with a short upward projection which can fit into the narrow channels formed on the inner surface of the extendible portion of the top wall. The short upward projection, when it contacts the inner surface of the extendible portion of the top wall causes the slightly flexible wall portion to flex downward. When the short protection fits into one or more of the narrow channels the flex in the slightly flexible wall firmly engages the projection into the channel. This engagement securely holds the sliding extendible top wall portion in place.

At the front of the top wall, at the point where the front lip of the hanger is formed, one or more rounded channels may be provided, of a size which corresponds to the outer diameter of the customarily used air line tubing. Generally these channels are circular, forming about a one half to about three quarter portion of the circle, with the remaining portion, in the front, left open. This allows for placing the air line tubing into the rounded channels by pinching the tubing walls together, and pushing the tubing through the opened portion of the groove. These grooves provide a means to secure the air line tubing and direct this tubing down into the aquarium. The rounded channels may be formed in a portion of the top wall which projects past the point where the front wall of the hanger is formed.

Additionally, short wall segments may be formed on the inner surface of either the front lip or back wall of the hanger. These short walls can be either horizontal or vertical, and project towards the opposite wall. When the hanger is securely fit on the aquarium, the short wall segments on the front wall inner surface contact the inner wall surface of the aquarium. The short wall segments on the inner surface of the back wall contact the outer surface of the aquarium wall.

The present inventive hanger may also be provided with a cover. The cover fits over the portion of the hanger top wall where the valve system is attached. This protects the valve system from built up mineral deposits and other accumulating debris. The cover is particularly important in the present invention since the valve system is at the top of the tank and more susceptible to accumulating deposits. The cover may be completely removable or mounted on a hinge so that it may lift off from the valve system to provide ease of access to the valve controls.

A suitable cover may be formed from a sheet of plastic, or other noncorrosive material of about the same width as the hanger top wall. It is preferable to form the cover of a transparent, or semi-transparent material in order to allow visual inspection of the valve controls when the cover is down. An approximately right angle bend is formed at the front of the sheet, in a downward direction to form a front wall of the cover. This provides protection for both on top and front of the valve system. Suitable grooves are formed in the front wall of the cover in order to allow the passage therethrough of air line tubing.

The cover may be suitable mounted in a hinged fashion by providing downwardly projecting hinge posts from the back part of the under side of the cover. A hole is formed in the bottom of the hinge posts. Corresponding upwardly projecting wall segments may then be formed on the upper surface of the top wall of the hanger. Small studs are formed from these segments of a size which can fit into the corresponding holes in the downward projections from the cover, while still retaining the ability to rotate in the hole. The upper and lower projecting segments are spaced so that the small projections may be securely held in the holes while the cover is rotated up and down.

BRIEF DESCRIPTION OF THE DRAWINGS

The above and other objects and the attendant advantages of the present invention will become more readily apparent by reference to the following detailed description when considered in conjunction with the accompanying drawings wherein.

Like references refer to like parts throughout the several views of the drawings.

DETAILED DESCRIPTION OF THE PREFERRED EMBODIMENT

Figure 1:
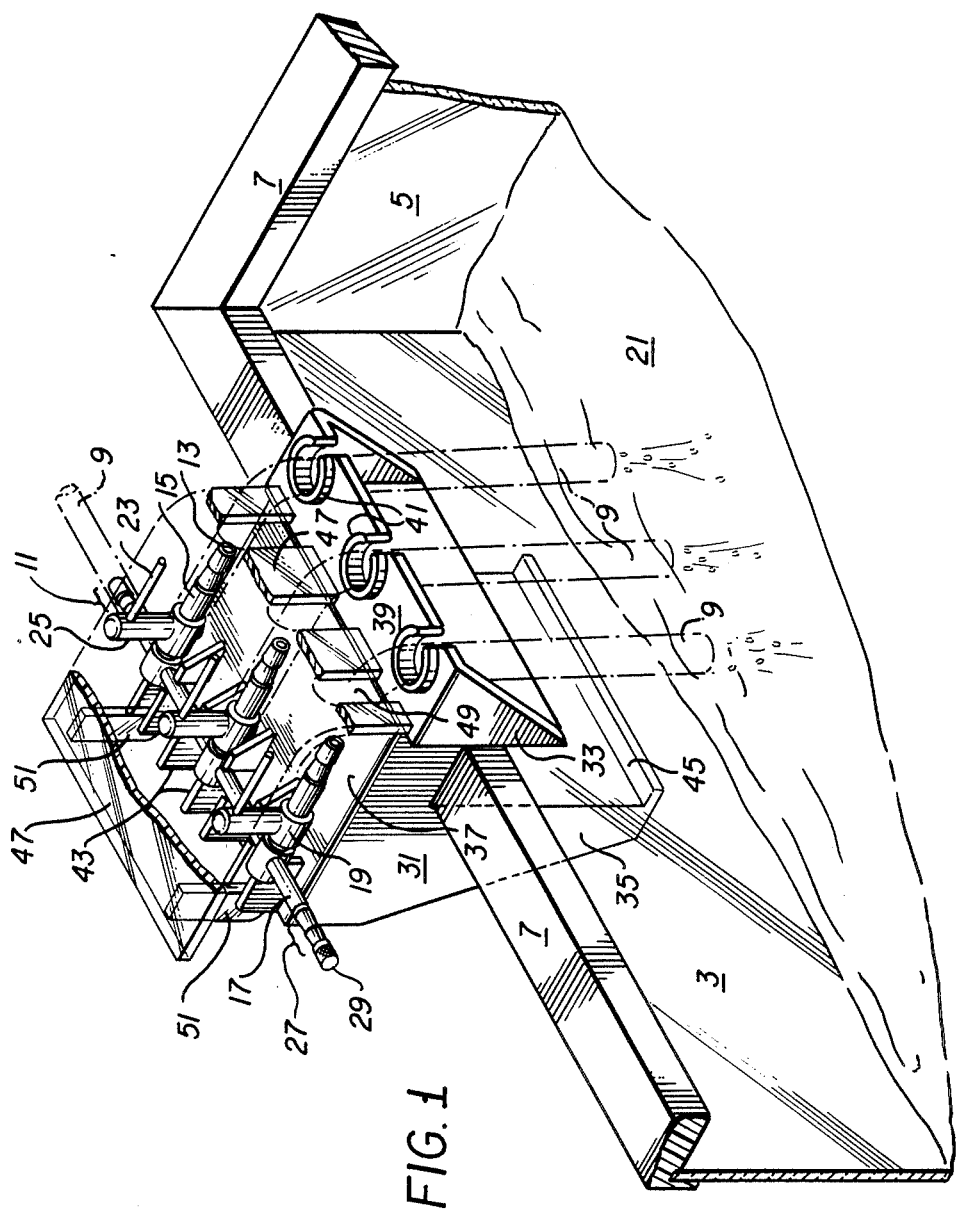
FIG. 1 is a perspective view of the preferred embodiment of the present invention when it is in position for use on the top of an aquarium back wall.

FIG. 1 shows a perspective view of the preferred embodiment of the present invention. The an aquarium air valve system and hanger unit 1 is positioned over the back wall 3 of an aquarium 5. The top frame 7 of the aquarium 5 is visible. Air line tubing 9 is connected to the entry orifice by securely fitting the tubing end over the hollow projection 11 which forms the entry orifice. The outer end of this tube is connected to the outlet orifice of an aquarium air pump which is not illustrated. The valve system body 17 is in a cylindrical form. At the end of the valve system body 17 which is opposite from the entry orifice hollow projection 11, is another hollow projection 27. The orifice of the hollow projection 27 is closed off, either partially, or totally, with a stopper screw 29.

Three valves 19 are formed between segments of the valve body 17. Air line tubing 9 is connected to the three exit orifices 13, of the valves 19 by securely fitting the ends of the air line tubing 9 over the hollow projections 15, which form the exit orifices 13. The number of valves 19 is variable depending upon the intended use of the air supply and the power of the aquarium air pump used. The other ends of the tubing provide air into the aquarium water and may be connected to various aquarium accessaries or ornaments. The flow of air through the exit orifices 13 are controlled by valve controls, which are illustrated in the form of lever bars 23 having projecting segments 25. The entire valve system, composed of the above described valve system components, is formed from chrome coated brass. Other noncorrosive materials such as plastic, uncoated brass, or other non-corrosive metal may also be used to form the valve system.

The hanger unit 27, preferably formed from plastic, or other noncorrosive material is hung over the aquarium back wall. The U shaped top segment of the hanger unit 31 is inverted over the top frame 7 of the aquarium back wall 3. The U shaped top segment is formed by the front lip 33, the elongated back wall 35, and the top wall 37. The length of the top wall is adjusted by pulling out an extendible top wall portion attached to the front lip 33. In the illustrated embodiment the front lip 33 is formed with an extension portion 39 which juts out above the aquarium. Rounded channels 41 are formed in the extension portion 39. These rounded channels, with open fronts allow the passage of air line tubing 9 therethrough, in order to securely direct the air line tubing 9 into the aquarium water 21.

In the present invention, as opposed to general practice, the valve system is mounted on the top wall of the hanger 37. The mounting is accomplished by forming a channel from upwardly projecting walls 43 on the top wall 37 of the hanger unit 31 into which the valve system body 17 is fitted. The upwardly projecting walls 43 also from channels into which the valves 19 are fit. Short wall segments 45 are formed on the inner side of the hanger walls. The short wall segment 45 is formed on the inner surface of the back wall is illustrated. The short wall segments 45 may be formed in any manner so that they contact the aquarium wall 5 or aquarium ornamental background, in order to hold the hanger securely in place.

A cover 47 is hingably attached to the hanger. It is preferable to form the cover 47 of clear plastic in order to allow visibility of the valve control. Grooves 49 are formed in the front wall of the cover 47 in order to allow the air line tubing 9 to pass through when the cover 47 is down. In the illustrated embodiment the cover is hingably attached to the hanger by hinge posts 51.

Figure 2:
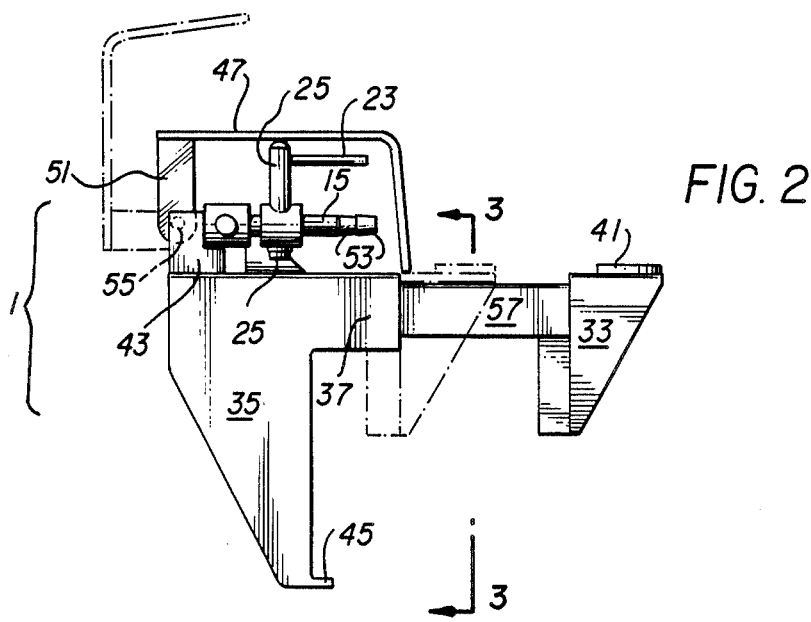
FIG. 2 is a side view of the an aquarium air valve system and hanger unit showing the adjustable top wall, and hinged cover.

FIG. 2 illustrates a side view of the preferred embodiment of the present invention. The solid portion of the drawing illustrates the front lip 33 fully extended while the dotted drawing of the front lip illustrates the closed position. This shows the extendible portion of the top wall 57. By sliding the extendible top wall 57 the adjustment of the length of the top of the hanger unit 31 provides different sizes for the U shaped top segment to accommodate various sizes of aquarium top frames. A short wall segment 45 is pictured on the inner side of the front lip 33.

FIG. 2 also reveals a valve control consisting of the lever bar 23 and a projecting segment 25. The projecting segment 25 goes exactly through the valve 19 and the bottom portion of the projecting segment is visible under the valve. The hollow projection 15 of the exit orifice has ridges 53 formed thereon with the tip end larger than the mid section. This allows for secure fit of the air line tubing.

FIG. 2 further depicts the hingably mounted cover 47, illustrated in the opened and closed positions. The bottom end of the hinge post 51 is provided with a hole into which a stud 55 is fitted. The stud 55 is formed on the side of an upwardly projecting wall 43, projecting from the top wall 37 of the hanger. The hole in the hinge post 51 may rotate around the stud 55. The cover 47 completely shields the valve system from accumulating metallics and other debris.

Figure 4:
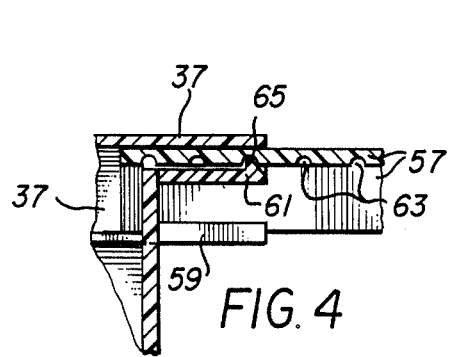
FIG. 4 is a side cutaway view of a section of the slidable top wall.
Figure 3:
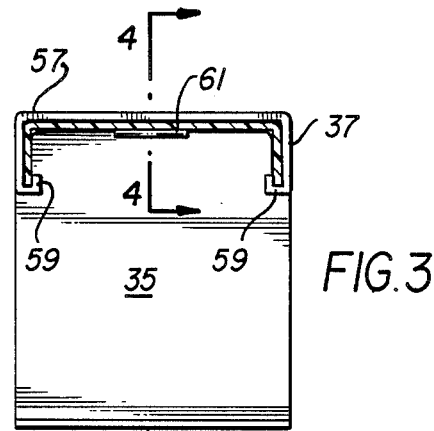
FIG. 3 is a front view of the inner surface of the back wall of the hanger with the front portion cut away.

FIG. 3 is a cross section through the extendible top wall portion 57, removing the front lip 33. (FIGS. 3 and 4 illustrate the slidable adjustable hanger unit, with the valve system, cover, and other projections from the top wall of the hanger removed). The inner surface of the back wall 35 is pictured with the short projecting wall 45 at the bottom. The extendible top wall portion 57 is slidable positioned within a sleeve 59 formed by the sides of the top wall 37. The front of the slightly flexible wall portion 61 is visible This slightly flexible wall portion 61 projects from the inner side of the upper portion of the back wall 35.

Figure 5:
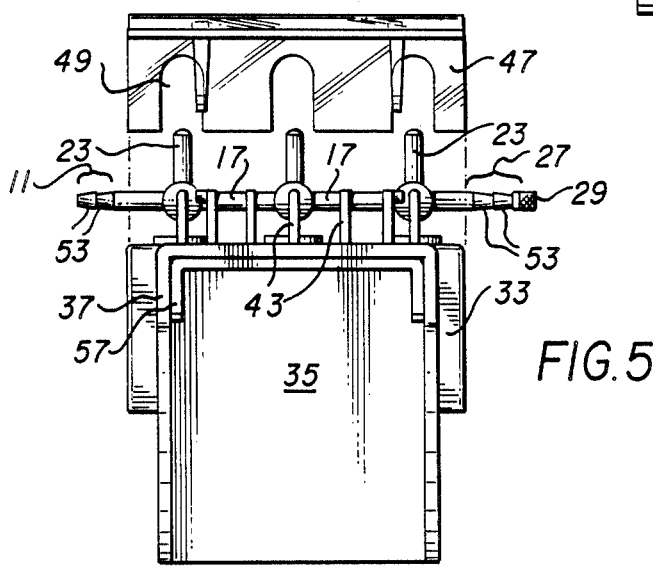
FIG. 5 is a back view of the an aquarium air valve system and hanger unit.

FIG. 4 further illustrates the slidable adjustment of the length of the top wall, showing the manner in which the extendible top wall portion 57 may be securely held in place. The extendible top wall portion 57 is slidable positioned within a sleeve 59 formed from the sides of the top wall 37. The slightly flexible projecting wall 61 has a short upward projection 65. The short upward projection 65 engages channels 63 on the inner surface of the extendible top portion 57. When the channels 63 and projection 65 are engaged the extendible top portion 57 is kept in place, and will therefore not inadvertently slide or change position. This arrangement also allows for ease of adjustment since the extendible top portion may be moved by disengaging the projection 65 from the channel 63 by FIG. 5 is a back view of a preferred embodiment of the resent invention. The cover 47 is illustrated as is the top mounted position of the valve system. The ridges 53 of the hollow projections are also pictured. A stopper screw is positioned in the hollow projection 27 on the end of the valve system body opposite the entry orifice. The short projecting walls 43 on the upper surface of the top wall 37 form a channel for the valve system body 17. Further, the arrangement of the back of the extendible top wall portion 57, the top wall 37, and the back wall 35 is illustrated.

It is readily apparent that the above described aquarium air valve system and hanger unit meets all the objectives mentioned and also has other advantages for use in the aquarium. It should be understood that the specific form of the invention hereinabove described is intended to be representative only, as certain modifications within the scope of these teachings will be apparent to those skilled in the art of aquarium air valve systems and hanger units.

Accordingly, reference should be made to the following claims in determining the full scope of the invention.

What is claimed is:

1. An aquarium valve system and hanger unit comprising:
   a noncorrosive valve system having a hollow valve system body, with at least one exit orifice in the form of a valve projecting from an intermediate point thereon, the valve having a hollow projection for connecting air line tubing thereto, and a control means for controlling air flow through the hollow projection, the valve body further having an entry orifice in the form of a hollow projection projecting from an end of the valve body for connecting air line tubing thereto, the valve system is mounted upon a valve hanger unit, on an outer surface of a top wall thereof,
   the hanger unit having a front lip, projecting at a right angle from a front portion of a top wall, and a back wall projecting at right angle from back portion of the top wall, forming a substantially U shape, the top wall of the of the hanger unit having a means for adjusting the length of the top wall to differing sizes.

2. The aquarium air valve system and hanger unit as defined by claim 1, further comprising a valve system cover, mounted on the top wall, covering over at least the valve system.

3. The aquarium air valve system and hanger unit as defined by claim 2, wherein the valve system cover is hingebly mounted to the outer surface top wall of the hanger unit.

4. The aquarium air valve system and hanger unit as defined by claim 3 wherein the back wall of the hanger unit is longer than the front lip.

5. The aquarium air valve system and hanger unit as defined by claim 3, wherein the valve system is made of brass.

6. The aquarium air valve system and hanger unit as defined by claim 5, wherein the means to adjust the length of the top wall is an extendible top wall front portion, slidably mounted onto a non-extendible back portion of the top wall.

7. The aquarium air valve system and hanger unit as defined by claim 3, wherein the valve control means is a lever bar control, with a projection into the hollow of the hollow projection of the valve.

8. The aquarium air valve system and hanger unit as defined by claim 3, wherein the means to adjust the length of the top wall is an extendible top wall front portion, slidably mounted onto a non-extendible back portion of the top wall.

9. The aquarium air valve system and hanger unit as defined by claim 3, wherein the valve system cover is formed of transparent or semi-transparent plastic.

10. The aquarium air valve system and hanger unit as defined by claim 1, wherein the valve control means is a lever bar control, with a projection into the hollow of the hollow projection of the valve.

11. The aquarium air valve system and hanger unit as defined by claim 1, wherein the valve system is made of brass.

12. The aquarium air valve system and hanger unit as defined by claim 1, wherin the hanger unit is made of plastic.

13. The aquarium air valve system and hanger unit as defined by claim 1 wherein the back wall of the hanger unit is longer than the front lip.

14. The aquarium air valve system and hanger unit as defined by claim 1, wherein the means to adjust the length of the top wall is an extendible top wall front portion, slidably mounted onto a non-extendible back portion of the top wall.

15. The aquarium air valve system and hanger unit as defined by claim 1, wherein the valve system is mounted in a channel formed by short wall segments upwardly projecting from the outer surface of the top wall of the hanger unit.

16. The aquarium air valve system and hanger unit as defined by claim 1, wherein the top wall projects past the front lip, and has thereon rounded grooves for directing air line tubing into an aquarium.

17. An aquarium valve system and hanger unit comprising:
- a noncorrosive valve system, formed of brass, having a hollow valve system body, with at least one exit orifice in the form of a valve projecting from an intermediate point thereon, the valve having a hollow projection for connecting air line tubing thereto, and a control means in the form of a lever bar and projection therefrom into the hollow of the hollow projection, for controlling air flow through the hollow projection, the valve body further having an entry orifice in the form of a hollow projection projecting from an end of the valve body for connecting air line tubing thereto, the valve system is mounted upon a valve hanger unit, on an outer surface of a top wall thereof,
- the hanger unit being formed from plastic, having a front lip, projecting at a right angle from a front portion of a top wall, and a back wall, longer than the front lip, projecting at right angle from back portion of the top wall, forming a substantially U shape, the top wall of the of the hanger unit being formed in two portions, an extendible front portion which is slidable mounted into a back portion, in order to allow for adjusting the length of the top wall to differing sizes and
- a valve system cover formed of transparent or semi-transparent plastic, covering at least the valve system, hingeably mounted to the outer surface of the top wall of the hinge unit.

18. The aquarium air valve system and hanger unit as defined by claim 7, wherein the valve system cover is formed of transparent or semi-transparent plastic.

* * * * *